3,259,471
PRODUCING SODIUM SESQUICARBONATE USING DIATOMACEOUS EARTH AS A FILTER AID
Peter G. Cortessis, Westend, and Frederick E. Boyer, Trona, Calif., assignors to Stauffer Chemical Company, New York, N.Y., a corporation of Delaware
Filed Mar. 25, 1963, Ser. No. 267,434
2 Claims. (Cl. 23—302)

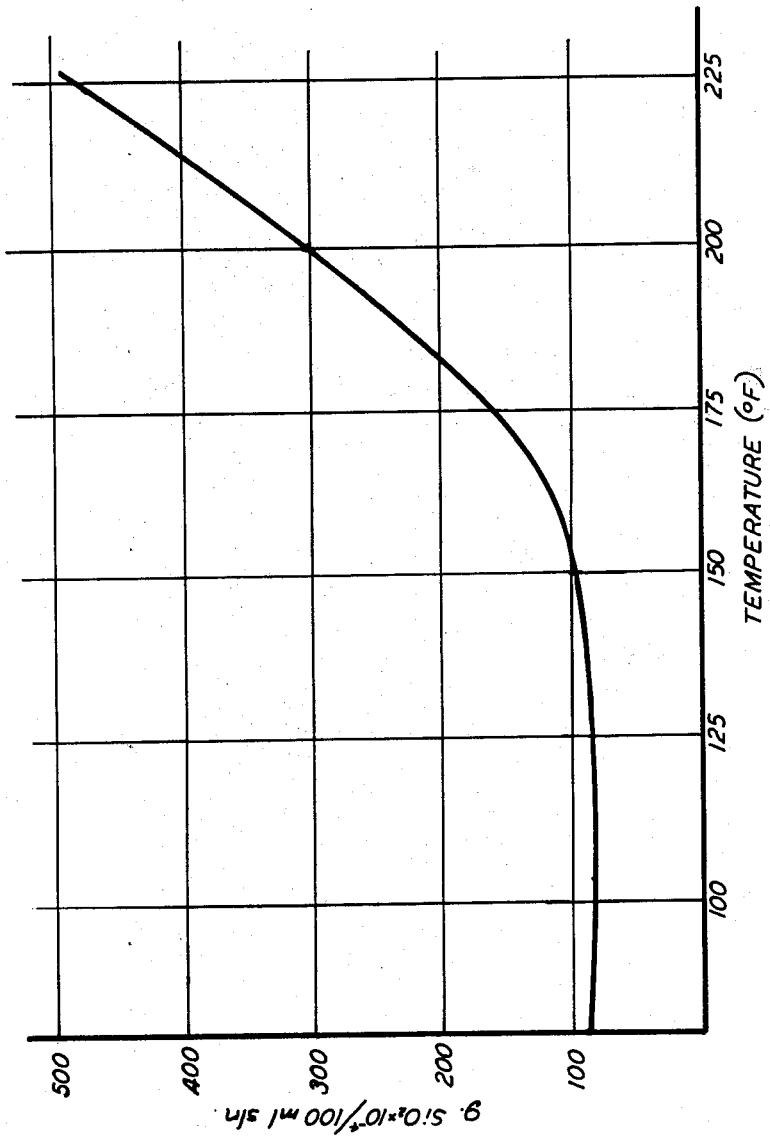

This invention relates to a method of preparing low silica-containing sodium carbonate, sodium bicarbonate, sodium monohydrate, and sodium sesquicarbonate.

More particularly, the present invention relates to the production of these carbonates in the well-known sesquicarbonate process from trona.

The standard sesquicarbonate process is typified by processes disclosed in U.S. Patents No. 2,346,140, 2,704,239, 2,780,520, 2,792,282, and 3,028,215. In general, such processes consist of dissolving raw ground trona in hot water and/or hot unsaturated aqueous sodium carbonate and filtering such hot solution to remove insolubles. The solution in the dissolving and filtering operation is maintained at a temperature of 185° F. to 212° F. as is indicated by the cited patents. The clarified and filtered solution may then be treated with an adsorbent such as activated carbon to remove any organic impurities present in the solution which tend to color the desired final product if need be. If such adsorbent-treating step is included in the general process, a second filtering operation on the sodium carbonate solution is performed at the same high temperature as the first filtration, i.e., 185–212° F. The refiltered solution is then passed to a crystallizer which precipitates sodium sesquicarbonate. While a single crystallizer might suffice, a series of crystallizers, which generally are double-effect evaporators, are usually used in commercial operations. The formed sesquicarbonate crystals are then separated from the slurry and dried. Any of the well-known separating equipment, such as a centrifugal separator, may be used for this purpose. The dried sodium sesquicarbonate crystals obtained from such a process may be marketed as is or they may be calcined to produce anhydrous soda ash.

One of the principal drawbacks to such prior art processes occurs in filtering the carbonate solution to remove insolubles therefrom. On filtering in the prior art processes using diatomaceous earth as filter aid or filter, the purity of the filtered solution with respect to silica values drastically increased. This large increase in silica content is caused by the basic carbonate solution leaching silica from the diatomaceous earth which is almost exclusively made up of silica. Thus, when such carbonates having low silica content are desired, more expensive filter aids must be used.

According to the present invention this drawback of the prior art processes is eliminated and the most desirable low-cost diatomaceous earth can be utilized as a filter aid without undue increases in silica content in the circulating liquor. This is accomplished by controlling the temperature of the solution being filtered.

FIG. 1 shows the effect of temperature on silica pickup from diatomaceous earth filter aids based on a one hour contact time with sodium carbonate solutions.

As is evident from FIG. 1, at temperatures above approximately 150° F., the amount of silica leashed from the diatomaceous earth increases rapidly. Thus, according to the present invention, diatomaceous earth filter aids are employed to filter sodium carbonate solutions at lower temperatures than those practiced by the prior art methods. The preferred filtered temperature range is 140–150° C., but any temperature less than approximately 150° F. may be employed without excessive leaching of silica from the diatomaceous earth filter aid.

The overall sesquicarbonate process according to the present invention would consist of (1) dissolving raw ground crude trona in water or an unsaturated aqueous sodium carbonate solution, (2) filtering said carbonate solution to remove insolubles using diatomaceous earth as a filter aid while the temperature of the solution being filtered is less than approximately 150° F., (3) treating said filtered solution with an adsorbent, such as activated charcoal, to remove any organic matter present in the solution, (4) refiltering said solution as before, (5) crystallizing the sodium sesquicarbonate from the solution, and (6) separating and drying the crystallized sodium sesquicarbonate from the remaining solution. As stated previously, steps 3 and 4 are optional and depend solely on whether the organic content of the solution is sufficient to be detrimental to the finished product. The remaining solution may be recycled back into the process for further removal of carbonate values.

We claim:
1. In a process for producing sodium sesquicarbonate from trona ore which comprises (1) grinding said ore, (2) dissolving the soluble portion of said ground ore in an aqueous media, (3) filtering the resultant solution to remove insolubles therefrom, (4) crystallizing sodium sesquicarbonate from said filtered solution, (5) separating said crystals of sodium sesquicarbonate from the remaining solution and (6) drying said crystals, the improvement comprising filtering said resultant solution of step (3) using diatomaceous earth as a filtration aid and maintaining the temperature of the sodium carbonate solution at less than approximately 150° F. while in contact with the diatomaceous earth.

2. The process as stated in claim 1 wherein the filtration temperature is in the range of 140–150° F.

References Cited by the Examiner
UNITED STATES PATENTS

| | | | |
|---|---|---|---|
| 2,287,856 | 6/1942 | Beekhus et al. | 23—63 X |
| 2,346,140 | 4/1944 | Pike | 23—63 X |
| 2,655,438 | 10/1953 | Gilkey et al. | 23—300 X |

NORMAN YUDKOFF, *Primary Examiner.*
GEORGE D. MITCHELL, *Examiner.*
A. J. ADAMCIK, *Assistant Examiner.*